United States Patent [19]

Sakakibara et al.

[11] Patent Number: 5,140,363
[45] Date of Patent: Aug. 18, 1992

[54] IMAGE PROJECTOR

[75] Inventors: Katsunori Sakakibara, Fujisawa; Yasuhide Kokura, Sagamihara, both of Japan

[73] Assignee: Minolta Camera Co., Ltd., Osaka, Japan

[21] Appl. No.: 731,514

[22] Filed: Jul. 17, 1991

[30] Foreign Application Priority Data

Jul. 19, 1990 [JP] Japan .................. 2-191439

[51] Int. Cl.⁵ ............................. G03B 13/28
[52] U.S. Cl. ........................... 355/45; 355/68; 355/214
[58] Field of Search .............. 355/45, 214, 67, 68, 355/44

[56] References Cited

U.S. PATENT DOCUMENTS

| 4,153,364 | 5/1979 | Suzuki et al. | 355/68 |
| 4,963,923 | 10/1990 | Kusano et al. | 355/68 |
| 5,068,687 | 11/1991 | Kamimura et al. | 355/68 |

FOREIGN PATENT DOCUMENTS

60-45436 10/1985 Japan .
61-194436 8/1986 Japan .
61-282839 12/1986 Japan .

Primary Examiner—Monroe H. Hayes
Attorney, Agent, or Firm—Price, Gess & Ubell

[57] ABSTRACT

An apparatus and method for detecting an image density of an original document is provided. The density of the image of an original document is determined during the changing of the zoom magnification of a zoom lens. A control signal for the image density is then utilized to control an imaging operation.

20 Claims, 9 Drawing Sheets

IMAGE PROJECTOR

BACKGROUND OF THE INVENTION

1. Field of the Invention

The present invention relates to an image projector for microfilm reader-printers, and electrophotographic copying machines and the like.

2. Description of the Related Art

The aforesaid type of image projector has a density detector for photoreception of the projection image of an original document for detecting the image density of the document at the photoreception portion. Adjustment of the light intensity of the light source, discrimination of positive or negative original document, and control of other image forming conditions is accomplished in accordance with the density variation and distribution of the detected image density.

The detection of the image density is preferably accomplished over as broad a region as possible for the original document image, and a variety of arrangements have been tried to prevent an inclination of a portion of the image or the vertical and horizontal lines. For example, one method provides a multiple arrangement of a plurality of photoreception portions in a range corresponding to the projection image, while another method moves a photoreceptor portion over the projection image by means of a moving mechanism unique to the photoreceptor portion and provided with a cam, as described in Japanese Laid-Open Patent Application No. 60-45436.

However, arrangements providing multiple photoreception portions, and having a unique moving mechanism with a cam, such as the arrangement described in Japanese Laid-Open Patent Application No. 60-45436, are complex in construction, increase the overall size of the apparatus, and thereby present certain disadvantages with respect to control and labor.

SUMMARY OF THE INVENTION

A main object of the present invention is to provide an image projector capable of detecting the density of an original document over a broad range.

Another object of the present invention is to provide an image projector having a simple construction and which is capable of detecting the density of an original document over a broad range.

A further object of the present invention is to provide an image projector that is compact in size, inexpensive, and readily controllable while having a simple construction, and which is capable of detecting the density of an original document over a broad range.

These and other objects of the present invention are achieved by providing an image projector for projecting an original document image onto an exposure member while scanning said document by producing relative movement between the original document and an optical unit, said image projector being characterized by providing a zoom lens for changing the magnification of the projection image, a zooming means for automatically zooming the zoom lens, and a density detecting means for photoreception of the projection image passing through the zoom lens to detect the density of the original document.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described in detail hereinafter with reference to the accompanying drawings.

Figure 1:
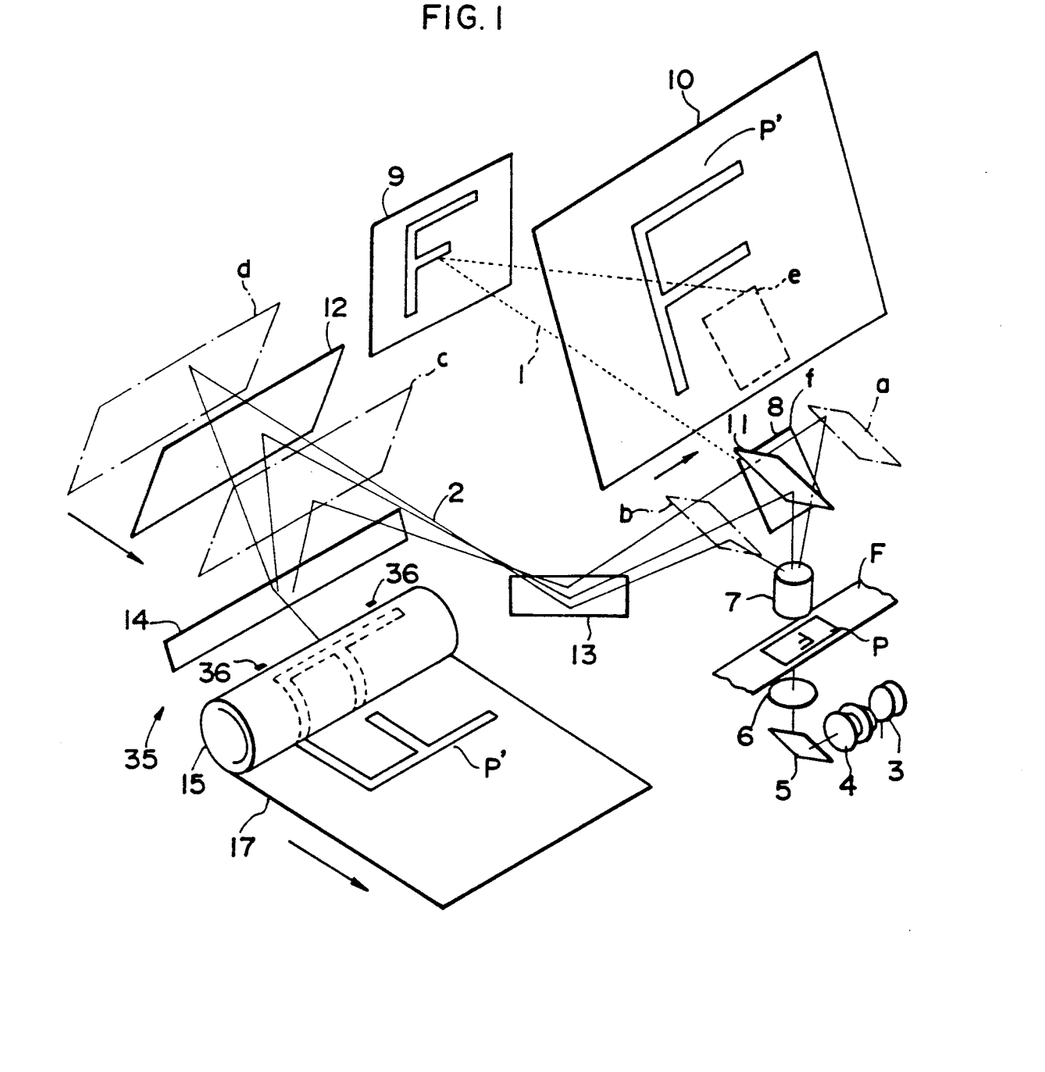
FIG. 1 is a perspective view showing an embodiment of the optical unit of the image projector of the present invention.
Figure 2:
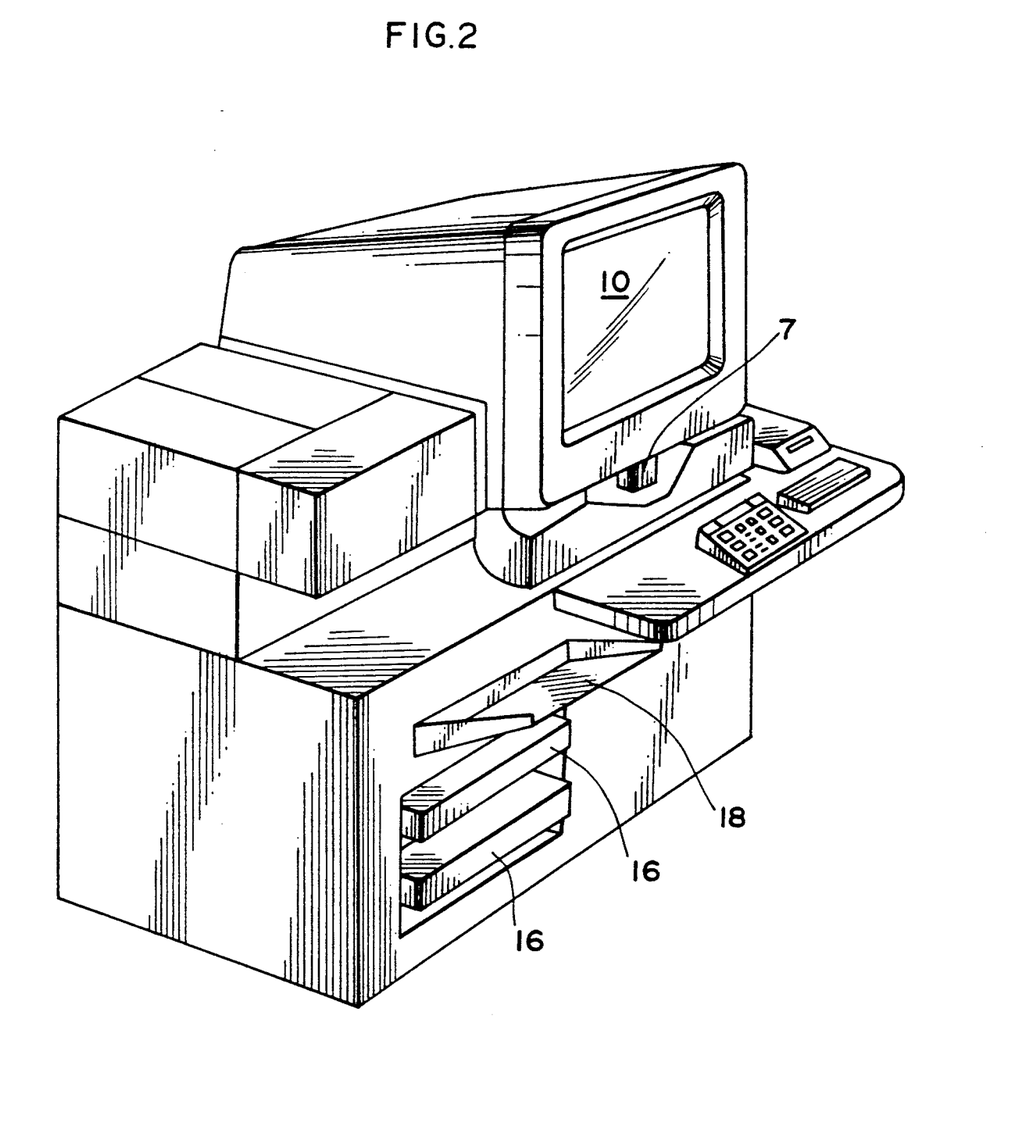
FIG. 2 is an exterior perspective view of the image projector.

FIG. 1 is a perspective view of the optical system in one embodiment of the invention. FIG. 2 is an exterior perspective view of a reader-printer with the optical unit of FIG. 1 installed therein. The aforesaid reader-printer is one example of an image projector; the optical unit has a reader optical path 1 and a printer optical path 2 which can be switchably used.

The light from the light source 3 is transmitted through the movable condenser lens group 4, the reflecting mirror 5, and the stationary condenser lens 6, so as to arrive at the image P of the original document microfilm F. The image P is enlarged and projected by means of the aforesaid light through the zoom lens 7 which is the projection lens.

In the reader mode, the reader optical path 1 is formed as indicated by the broken line in FIG. 1. That is, the light from the zoom lens 7 is reflected by the first reader mirror 8 at the reader position and the stationary second reader mirror 9 so as to be projected onto the screen 10. Thus, the image P is projected and enlarged onto the screen 10 provided at the top front of the reader-printer. During that time, the first print mirror 11 is retracted from the reader optical path 1 to retracted position [a]. The third printer mirror 12 is held at the standby position [c].

In the printer mode, the printer optical path 2 is formed as indicated by the solid line in FIG. 1. That is, the first reader mirror 8 is moved upwardly from the reader position [f], so as to be retracted from the formed printer optical path 2 to the retracted position [e]. Conversely, the first printer mirror 11 is moved from the retracted position [a] to the main scan start position [b], and the third printer mirror 12 is moved from the standby position [c] to the main scan start position [d] for prescanning, and thereafter each respectively moves to accomplish the main scan in the direction indicated by the arrow in the drawing.

The light from the zoom lens 7 is reflected by the first printer mirror 11, the stationary second printer mirror 13, the third printer mirror 12, and the stationary fourth printer mirror 14 so as to be projected onto the surface of the image bearing member of the photosensitive member 15. The image P is scanned, and projected enlarged through a slit (not shown in the drawing) onto the surface of the photosensitive drum 15 which rotates synchronously with the movement of the first printer mirror 11 and the third printer mirror 12. The image formation is then accomplished using a commonly known process, and the image P is transferred to a copy sheet 17 transported from the paper cassette 16, and said copy sheet 17 is then discharged to a discharge tray 18 (refer to FIG. 2).

Although the first printer mirror 11 and the third printer mirror 12 are moved for scanning in the example shown in the drawings, other methods may be used wherein scanning is accomplished by oscillating said mirrors, or wherein all mirrors of the optical unit are stationary and the microfilm F itself is moved for scanning.

Figure 3:
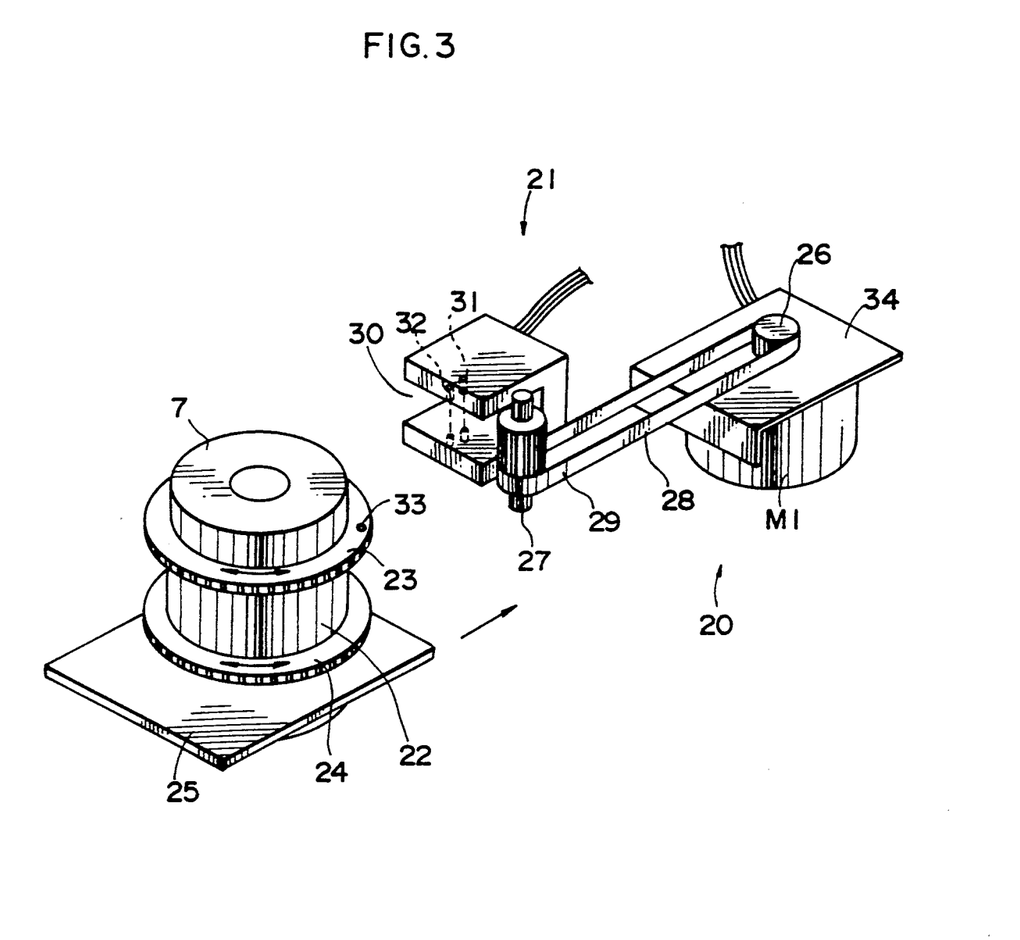
FIG. 3 is an exploded view showing the zoom lens, zooming means, sensor block and the like of the optical unit.

FIG. 3 is an exploded perspective view showing the zoom lens 7, zooming device 20 and the sensor block 21. The zoom lens 7 is detachably mounted to the main unit, and the zooming device 20 and the sensor block 21 are fixedly mounted on the main unit.

The zoom lens 7 is a projection lens capable of variably enlarging the projection image P. A zoom gear 23 and a focus collar 24 are provided on the outer surface of the lens barrel 22 of the zoom lens 7. The magnification of the zoom lens 7 is changed by forward and reverse rotation of the zoom gear 23, and a focussing adjustment is accomplished by forward and reverse rotation of the focus collar 24.

The zooming device 20 for automatic zooming of the zoom lens 7 comprises a pulse motor M1 for zooming, a rotatable shaft 27 arranged parallel to the motor drive shaft 26 of the zooming motor M1, a drive belt 28 looped between the motor drive shaft 26 and the rotatable shaft 27, and a lens gear 29 fixedly attached to the rotatable shaft 27. In the state described in FIG. 3 wherein the zoom lens 7 is installed in the arrow direction so as to engage the lens gear 29 with the zoom gear 23, the zoom lens 7 is zoomed automatically via the motor drive shaft 26, the drive belt 28, the lens gear 29, and the zoom gear 23 by means of the forward and reverse rotation of the zooming motor M1.

In the sensor block 21 are arranged a reference position detecting sensor 31 comprising a photoemitter and photoreceptor arranged with a specific spacing 30 therebetween, and a reference position detecting sensor 32 comprising a photoemitter and photoreceptor arranged with a specific spacing 30 therebetween. When the zoom lens 7 is held in the lens holder, the lens gear 29 engages the zoom gear 23, and a positional relationship is achieved wherein the ring portion of the zoom gear 23 is interposed within the space 30. A communicating hole type sensor hole 33 is provided in the ring portion of the zoom gear 23. The sensor hole 33 is positionable so as to be interposed between the photoemitter and photoreceptor of the reference position detecting sensor 31 via the rotation of the zoom gear 23.

Normally, the light emitted by the photoemitter of the reference position detecting sensor 31 is blocked by the ring portion of the zoom gear 23, but when the zoom lens 7 is zooming by means of the zoom motor M1 and the sensor hole 33 reaches the position of the reference position detecting sensor 31 via the rotation of the zoom gear 23, the light emitted by the photoemitter is not blocked by the ring portion and is received by the photoreceptor of sensor 31. Accordingly, the zoom lens 7 magnification can be readily calculated from the drive pulse of the zoom drive motor M1 based on the reference magnification of the zoom lens 7 when the sensor 33 is detected by the reference position detecting sensor 31. The reference position detecting sensor 32 is a reference position sensor for a replacement zoom lens (not shown in the drawing) using a different sensor hole 33 position. Item 34 in FIG. 3 is a mounting plate for mounting the zooming motor M1 on the lens holder.

The density detecting device 35 and the control device are described hereinafter.

The density detecting device 35 for detecting image density is provided a photoreception portion 36. In the photoreception portion 36 are photoelectric converting elements such as a CdS element, and, in the example in the drawing, two such elements are provided on both sides of the formed printer optical path 2 in near proximity to the print surface of the photosensitive member 15. As shown in FIG. 1, the photoreception portion 36 continuously receives light during the prescanning of the projection image P' that passes through the zoom lens 7 while zooming at a fixed position.

The image density detected by the density detecting device 35 based on the light received by the photoreception portion 36 is converted to electrical signals corresponding to said image density by means of an AD converter in the density detecting device 35.

Figure 4:
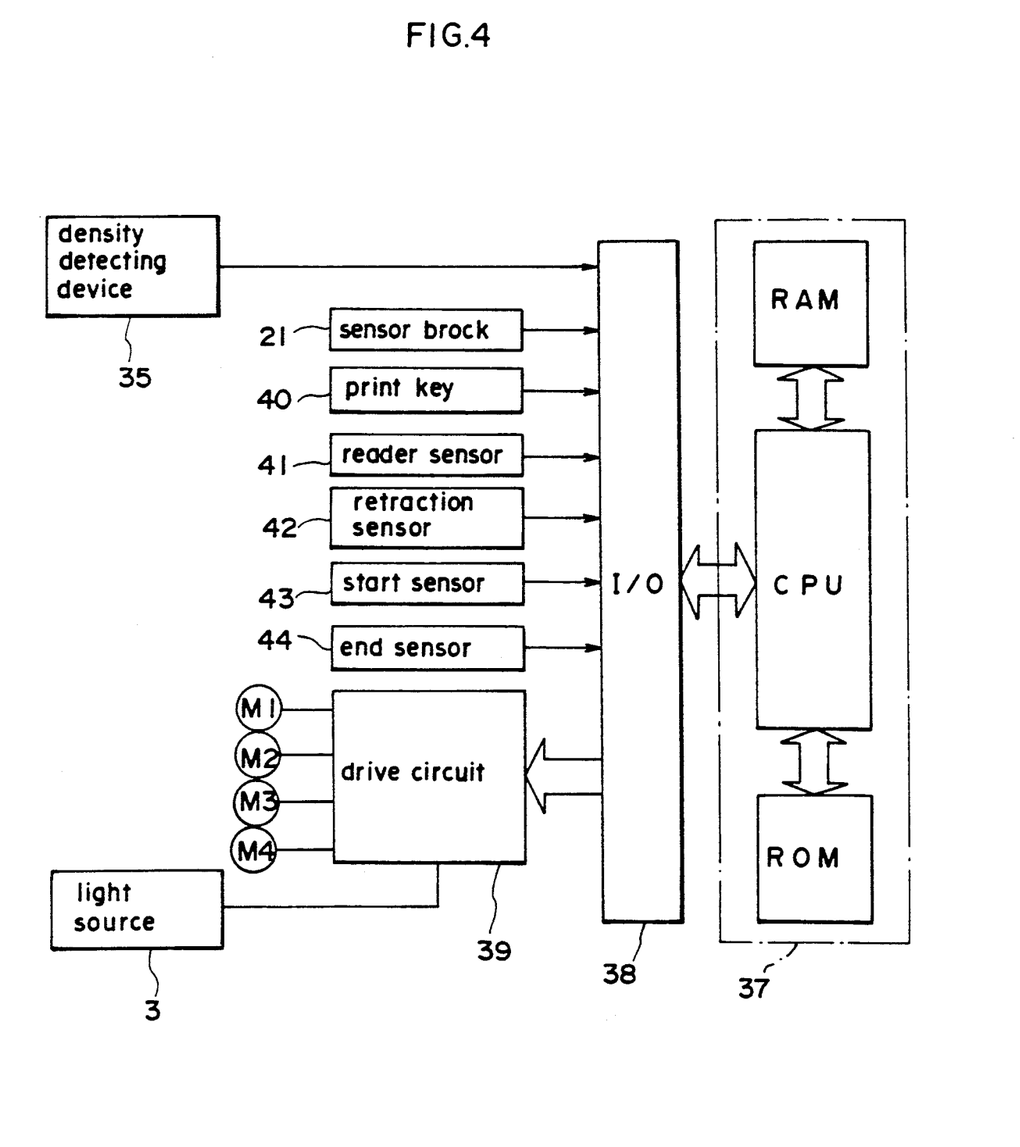
FIG. 4 is a circuit diagram of the control circuit of the image projector.

FIG. 4 is a block diagram of the control device for the reader-printer. The image density detection signals generated by the density detecting device 35 are input to the input/output (I/O) port 38 of the microcomputer 37 of the control device. Calculations are executed in the microcomputer 37 based on the read data and the aforesaid detection value, so as to control the image forming conditions in accordance with the density variation and distribution of the detected image density. That is, the lamp voltage control signals for the light source 3 are input to the I/O port 38, and output through the drive circuit 39, such that the amount of light from the light source 3 is increased or decreased in accordance with said output, so as to suitably adjust the intensity of the image P' projected on the surface of the photosensitive member 15. Further, negative or positive microfilm F is discriminated by means of the image density, and positive or negative toner selection signals are output to a developing section to develop the electrostatic latent image formed on the surface of the photosensitive member 15 as a positive image. In addition, the developing bias voltage is controlled in accordance with the image density.

Various detection signals from components of the sensor block 21 such as the print key 40, the reader sensor 41 for detecting the reader position of the first reader mirror 8, the retraction sensor 42 for detecting the retracted position of the mirror 8, the start sensor 43 for detecting the main scan start positions [b] and [d] of the first printer mirror 11 and the third printer mirror 12, and the end sensor 44 for detecting the main scan end positions [a] and [c] of the first printer mirror 11 and the third printer mirror 12, are input to the microcomputer 37 through the I/O port 38, as shown in FIG. 4 (refer to FIGS. 1 and 3). Further, various control signals based on the aforesaid sensor detection signals are output from the microcomputer 37 through the I/O port 38 to the zoom motor M1 for the zooming device 20, moving motor M2 for the movable condenser lens group 4, swing motor M3 for the first reader mirror 8, and moving motor M4 for moving the first printer mirror 11 and the third printer mirror 12.

For example, the microcomputer 37 calculates the actuation of the moving motor M2 based on the detection signals of the reference position sensor 31 of the sensor block 21 and the drive pulse of the zoom motor M1, and outputs control signals for the various magnifications of the zoom lens 7. The illumination of the projection image P' on the surface of the photosensitive member 15 is maintained so as to be virtually constant in spite of changing the zoom magnification by continuously modifying the movable condenser lens group 4 via control of the moving motor M2 so as to sequentially change the angle of irradiation thereby. When the aforesaid control is not accomplished, the image density detection value detected by the previously mentioned density detecting device 35 must be corrected so as to correct the amount of variation in the light during zooming. Further, actuation OFF signals for the swing motor M3 of the first reader mirror 8 are output from the microcomputer 37 based on the detection signals of the reader sensor 41 and the retraction sensor 42. Normal rotation and reverse rotation OFF signals are also output for the moving motor M4 of the first printer mirror 11 and the third printer mirror 12 based on the detection signals of the start sensor 43 and the end sensor 44.

The density detection of the image projector previously described is accomplished over a broad region of the projection image by means of the light received at the photoreception portion 36 disposed at a fixed position, said projection image being enlarged and reduced continuously via the zooming device of the zoom lens 7 during prescanning.

The operation of the image projector is described hereinafter.

Figure 5:
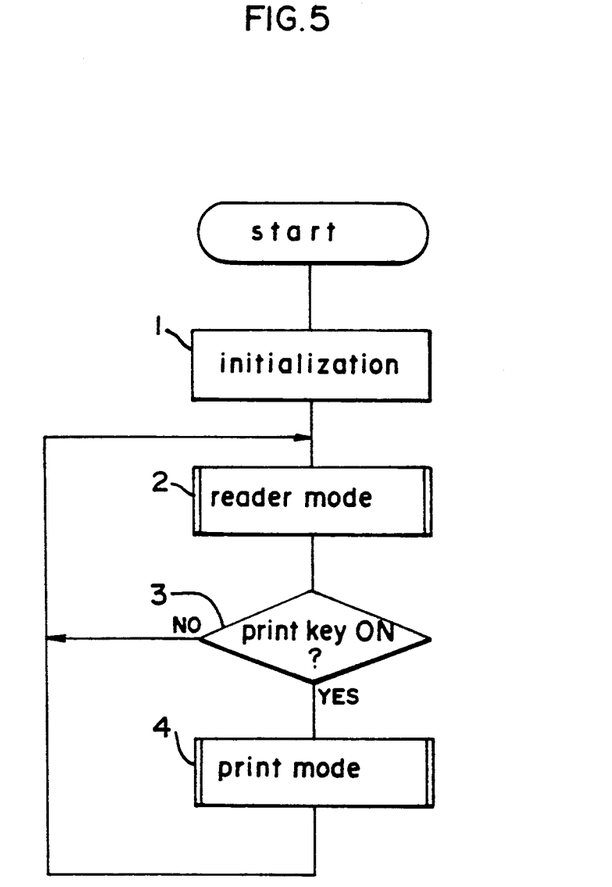
FIG. 5 is a flow chart showing the basic control sequence of the image projector.
Figure 6A:
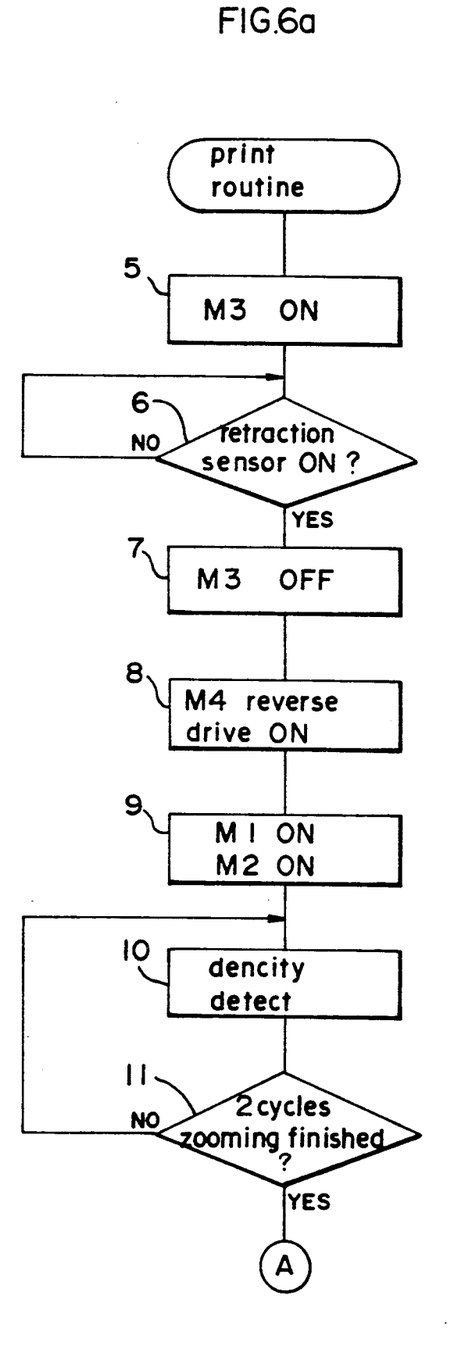
FIG. 6a-6c are a flow chart showing the print mode control.
Figure 6B:
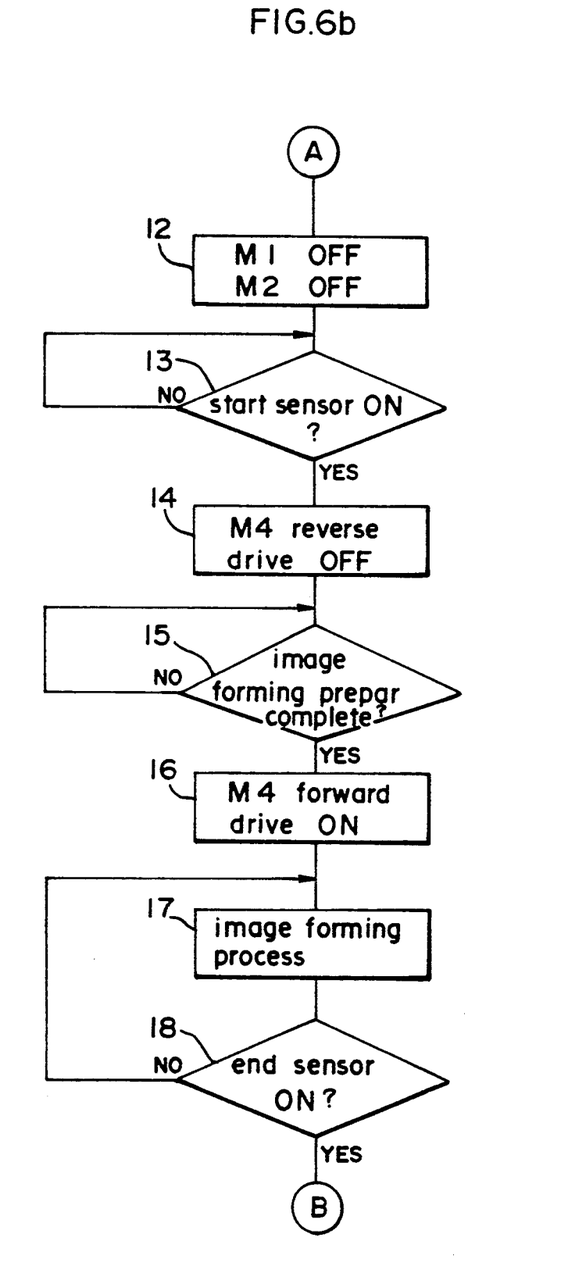
Figure 6C:
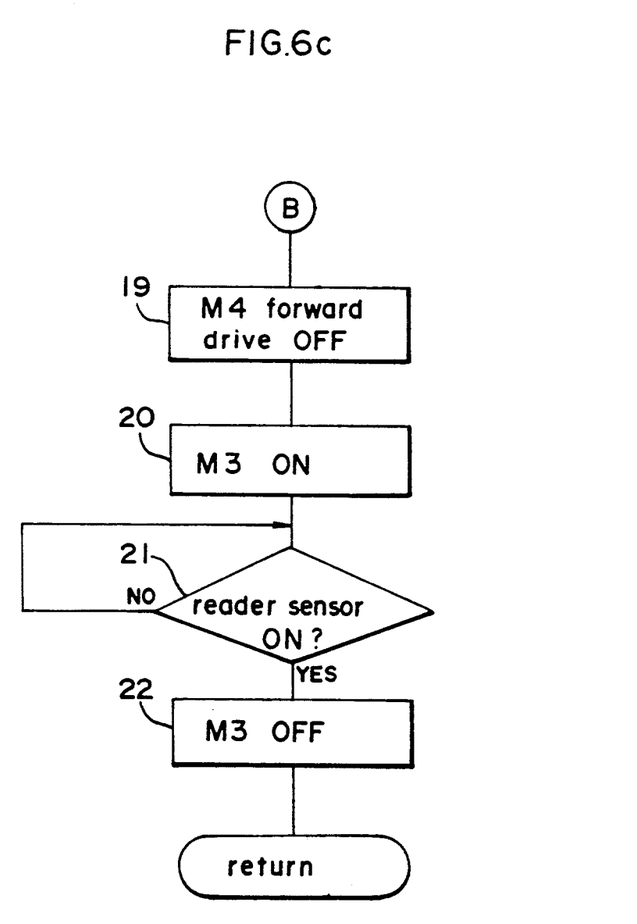

FIG. 5 is a flow chart showing the basic control sequence of the reader-printer, and FIG. 6 is a flow chart showing the print mode control sequence. When the main switch is turned ON, initialization is executed in step #1, and immediately thereafter the reader mode is set in step #2. If the print key 40 has been turned ON in step #3, the print mode is actuated in step #4, then the routine described in FIG. 6 is executed, and when the print mode has ended, the routine returns to step #2 of the reader mode.

In the printer mode, the swing motor M3 is turned ON in step #5, and the first reader mirror 8 is moved from the reading position [f] to the retracted position [e]. Then, in step #6, the retraction sensor 42 detects whether or not the first reader mirror 8 has moved to the retraction position [e]. If the retraction sensor 42 detects that first reader mirror 8 has moved to the retraction position [e], the swing motor M3 is turned OFF in step #7. Then, in step #8, the moving motor M4 is turned ON in reverse rotation, the first printer mirror 11 and the third printer mirror 12 are synchronously moved from the retraction positions [a] and [c] to the main scan start positions [b] and [d] for prescanning.

In steps #9, #10, #11 and #12, image density detection is executed. That is, in step #9, the zoom motor M2 for the zooming device 20 is turned ON and the zoom lens 7 starts zooming, then, the moving motor M2 is also turned ON and the movable condenser lens group 4 is moved so as to maintain a constant illumination intensity in spite of zooming. The pulse type zoom motor M1 is actuated for normal and reverse rotation between uniform pulses so as to zoom the zoom lens 7 over, for example, two cycles thereof. Next, in step #11, a check is made to determine whether or not two cycles zooming is completed, and, in step #12, the zoom motor M1 and the moving motor M2 are turned OFF.

During the previously described two cycle zooming, the image density is detected by the density detecting device 35 in step #10. The image density detection accomplished in the aforesaid step #10 is described hereinafter.

After the previously described step #8, the image P is scanned and projected, and the zoom lens 7 is zoomed in two cycles. That is, variable magnification of the zoom lens 7 starts at constant speed from a set magnification, for example, reduction, enlargement, reduction, enlargement, reduction, so as to stop at the original magnification. The reduction is set at 1/1.25 times the set magnification, and the enlargement is set at 1.25 times the set magnification. The first reduction and the final reduction are accomplished in ⅛ the time of the entire detection period. The intermediate enlargement, reduction and enlargement are each accomplished at ¼ the time of the entire detection period. Zooming is accomplished based on the aforesaid conditions.

During the prescanning and zooming, light is received by the photoreception portion 36 and the image density is detected by the density detection device 35. At this time, the photoreception portion 36 sequentially receives light from parts of the projection image P' at a fixed position due to the coordinated prescanning and zooming, such that photoreception tracks having a relatively zigzag shaped waveform, i.e., detection tracks, are drawn. The detection of the photoreception, i.e., image density, from the projection image P' is compositely accomplished from each part over a broad range of the projection image without an inclination of a portion of the image or the vertical and horizontal lines. Construction remains simple and is readily realizable because the composite photoreception/detection by the photoreception portion 36 disposed at a fixed position is accomplished by combining prescanning and zooming.

Figure 7A:
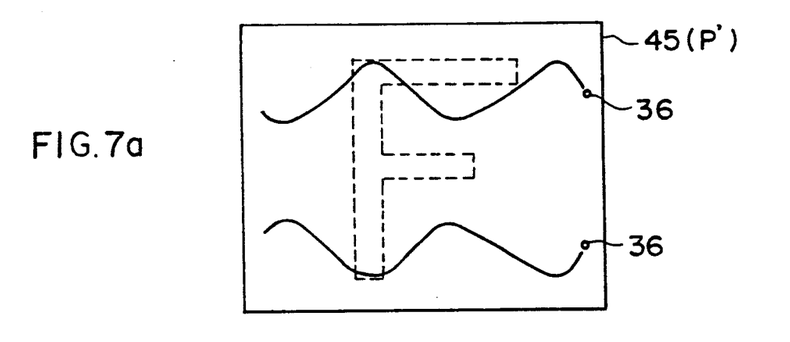
FIG. 7a-7c are an illustration of the photoreception pattern of the photoreception portion.
Figure 7B:
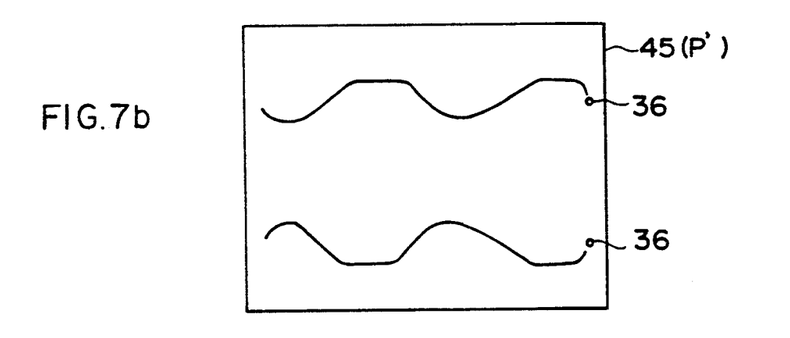
Figure 7C:
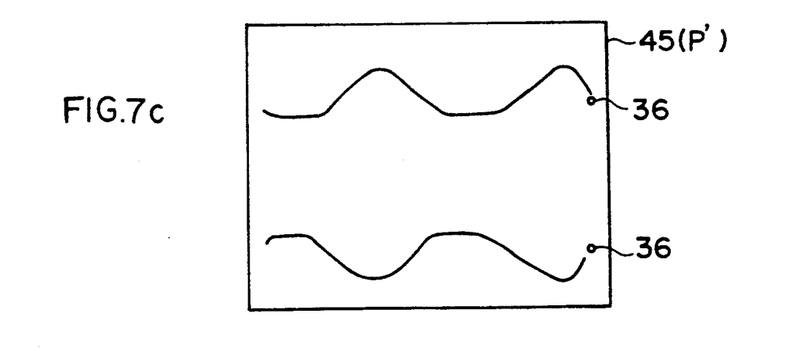

FIG. 7 is an illustration showing examples of the zigzag tracks of photoreception, i.e., detection tracks, under the previously described conditions. FIG. 7-*a* is a typical example; FIG. 7-*b* is an example wherein the tracks have parallel linear portions at the lower limit of zooming by zoom lens 7 during reduction from the set magnification; FIG. 7-*c* shows an example wherein the tracks have parallel linear portions at the upper limit of zooming by zoom lens 7 during enlargement from the set magnification. That is, the photoreception tracks, i.e., detection tracks, encompass a range described by the framed portion 45 of the projection image P' as shown in each of the drawings. The composite photoreception/detection is accomplished by drawing the zigzag waveform of two cycles corresponding to the two-cycle zooming and based on a specific amplitude. The examples in the illustrations are valid when zooming at constant speed, but said examples will differ when the zooming speed changes during enlargement and reduction, or when the zooming speed changes at a specific scanning position of the image P, i.e., at a scanned position in the image P. In the examples illustrated in FIGS. 7-*a*, 7-*b* and 7-*c*, zooming is interrupted when the zoom lens reaches the top and bottom of the scan. When considering an abrupt reversal of the zooming direction, however, compressed waveforms are produced, the number of waveforms is increased, and the parallel linear portions shown in FIGS. 7-b and 7-c are eliminated.

The image density detection signals detected by the density detection device 35 are input to the microcomputer 37, optimum image forming conditions are set in accordance with the image density, such as adjusting the intensity of the light source 3 and the like, and thereafter in step #17 the image forming process is accomplished.

The image density detection is accomplished in step #10, and when a check determines that zooming is completed in step #11, the zooming motor M1 and the moving motor M2 are turned ON in step #12. Then, in step #13, the start sensor 43 is turned ON, and when a check determines that the first printer mirror 11 and the third printer mirror 12 have reached the main scan start positions [b] and [d], the moving motor M4 is turned off in reverse rotation in step #14. That is, the movement of the first printer mirror 11 and the third printer mirror 12 is completed in the steps following step #8.

The flow of the routine continues to step #15 and when checks determine that, for example, copy sheet 17 preparation, photosensitive member 15 preparation, and other image forming and copying conditions have been executed, the routine continues to steps #16, #17, #18 and #19. In step #16, the moving motor M4 is turned ON in normal rotation, and the first printer mirror 11 and the third printer mirror 12 start moving from the main scan start positions [b] and [d] to the main scan end positions [a] and [c]. Then, in step #17, the image P is scanned and projected via a slit onto the surface of the photosensitive member 15, and image formation and copying are accomplished via conventional processes. The optimum conditions for image formation are achieved in correspondence with the image density as previously described, so as to automatically accomplish high-quality image formation and copying. When the end sensor 44 is turned ON in step #18, i.e., when the first printer mirror 11 and the third printer mirror 12 reach the main scan end positions [b] and [d], the normal rotation of the moving motor M4 is turned OFF in step #19.

Subsequently, in steps #20, #21 and #22, the swing motor M3 is turned OFF, and the first reader mirror 8 is detected at the reader position [f] by the reader sensor 41. The flow of the routine then exits the print mode and returns to step #2 of the reader mode.

Although the previously described embodiments have been described as using methods for moving the optical unit for scanning, it is to be understood that other methods may be used such as methods for oscillating the mirrors for scanning, or methods for moving the original document for scanning while the optical unit remains stationary. Further, the present invention is not limited in application to reader-printers, but is also suitable for electrophotographic copying machines and other image projectors.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is;

1. An image projector for projecting an original document image onto an exposure portion comprising:

a zoom lens capable of changing magnification of a projection image;

a zooming means for conducting zooming operation of said zoom lens; and a density detector for detecting density of said original document by photoreception of said projection image while the magnification of the zoom lens is changed by said zooming means.

2. The image projector as claimed in claim 1, wherein said density detector is provided in the neighborhood of the exposure portion.

3. An image projector for projecting an original document image onto an exposure portion comprising:

a scanning means for scanning said original document by producing relative movement between the original document and an optical unit;

a zoom lens capable of changing magnification of a projection image;

a zooming means for conducting a zooming operation of said zoom lens; and a density detector for detecting a density of the original document by photoreception of said projection image while the magnification of the zoom lens is changed by said zooming means.

4. The image projector as claimed in claim 3, wherein during the detection of said density of the original document, said zooming means changes magnification of said zoom lens between a maximum magnification and a minimum magnification at least once.

5. The image projector as claimed in claim 3, wherein when the zooming magnification reaches either a maximum magnification or a minimum magnification during the detection of the density of the original document, said zooming means alters the direction of the zooming operation to an opposite direction.

6. The image projector as claimed in claim 3, wherein the scanning operation is performed by moving the original document with the optical unit being held in a stationary position.

7. The image projector as claimed in claim 3, wherein the scanning operation is performed by moving the optical unit with the original document being held in a stationary position.

8. The image projector as claimed in claim 3, wherein when the zooming magnification reaches either a maximum magnification or a minimum magnification, said zooming means stops the zooming operation temporarily to maintain that magnification.

9. The image projector as claimed in claim 5, wherein said zooming means controls a zooming operation in a different speed between a case where the zooming magnification is being changed toward the maximum magnification and the case where the zooming magnification is being changed toward the minimum magnification.

10. An image reader printer operable in plural operation modes including a reader mode to display an original document on a screen and a printer mode to print the original document, comprising:

an optical means for projecting an image of the original document onto the screen at the reader mode and onto a photosensitive medium at the printer mode, said optical means including a zoom lens capable of changing the magnification of the projection image;

a density detector provided in the projection path of said optical means so as to receive a partial projection image; and a zooming means for conducting a zooming operation of said zoom lens so that said density detector receives light from different portions of the projection image.

11. The image reader printer as claimed in claim 10, wherein
said density detector is activated when the operation mode is altered from the reader mode to the printer mode.

12. The image reader printer as claimed in claim 11, wherein
said optical means includes a scanning means for optically scanning the original document, and said scanning means performs a pre-scanning motion during the change of the operation mode from the reader mode to the printer mode.

13. The image reader printer as claimed in claim 12, wherein
during detecting the density of the original document, the magnification of said zoom lens is changed from a maximum magnification to a minimum magnification by said zooming means at least once.

14. The image reader printer as claimed in claim 12, wherein when the zooming magnification of said zoom lens reaches either a maximum magnification or a minimum magnification, said zooming means stops zooming temporarily to maintain that magnification.

15. The image reader printer as claimed in claim 12, wherein when the zooming magnification reaches either a maximum magnification or a minimum magnification during the detection of the density of the original document, the zooming direction is altered to travel in the opposite direction.

16. The image reader printer as claimed in claim 13, wherein said zooming means controls a zooming operation so as to be operated in a different speed between the case where the zooming magnification is being changed toward the maximum magnification and the case where the zooming magnification is being changed toward the minimum magnification.

17. A method for detecting image density of an original document over a broad range comprising the steps of:
(1) projecting an image of said original document through a zoom lens,
(2) expanding or reducing said projection image by changing the zooming magnification of the zoom lens,
(3) detecting a density of an expanded or reduced projection image,
(4) repeating steps (2) and (3),
(5) establishing a control signal for image density according to detected densities, and
(6) controlling an imaging operation so as to provide a suitable image according to the control signal.

18. The method as claimed in claim 17, wherein the controlling step controls the strength of light irradiation for projecting the original document.

19. The method as claimed in claim 17, wherein the controlling step controls the bias voltage of a developing means for developing an image formed by projection of the document image on a photosensitive medium.

20. The method as claimed in claim 17, wherein the establishing step further includes a step of compensating for any error of a detected density occurred by changing the zooming magnification of said zoom lens.

* * * * *